United States Patent
Abe (12) United States Patent (10) Patent No.: US 6,778,223 B2
Abe (45) Date of Patent: Aug. 17, 2004

(54) IMAGE DISPLAY APPARATUS AND METHOD

(75) Inventor: Keiko Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/204,459

(22) Filed: Dec. 3, 1998

(65) Prior Publication Data

US 2002/0105593 A1 Aug. 8, 2002

Related U.S. Application Data

(63) Continuation of application No. PCT/JP98/01560, filed on Apr. 3, 1998.

(30) Foreign Application Priority Data

Apr. 6, 1997 (JP) ............................................. 9-103827

(51) Int. Cl.[7] .............................. H04N 5/46; H04N 5/91; H04N 5/93

(52) U.S. Cl. ........................ 348/559; 348/576; 348/578; 348/722; 345/473

(58) Field of Search ................................ 348/559, 560, 348/576, 578, 722; 345/328, 112, 141, 87, 473; H04N 5/91, 5/93, 5/46

(56) References Cited

U.S. PATENT DOCUMENTS

| | | | | |
|---|---|---|---|---|
| 5,459,830 A | * | 10/1995 | Ohba et al. .................. | 345/473 |
| 5,767,845 A | * | 6/1998 | Oashi et al. ................ | 348/475 |
| 5,870,754 A | * | 2/1999 | Dimitrova ................... | 348/722 |
| 5,926,603 A | * | 7/1999 | Tanaka et al. ................ | 386/53 |
| 5,999,173 A | * | 12/1999 | Ubillos ........................ | 345/328 |
| 6,154,600 A | * | 11/2000 | Newman et al. .............. | 386/4 |
| 6,353,461 B1 | * | 3/2002 | Shore et al. ................ | 348/722 |
| 6,587,123 B2 | * | 7/2003 | Ando et al. .................. | 345/723 |
| 6,628,303 B1 | * | 9/2003 | Foreman et al. ............ | 345/723 |

FOREIGN PATENT DOCUMENTS

| | | |
|---|---|---|
| JP | 5-289650 | 11/1993 |
| JP | 6-113253 | 4/1994 |

* cited by examiner

*Primary Examiner*—John Miller
*Assistant Examiner*—Brian P. Yenke
(74) *Attorney, Agent, or Firm*—Frommer Lawrence & Haug LLP; William S. Frommer; Bruno Polito

(57) ABSTRACT

Image data of still images are created based on data produced by one-dimensionally sampling a sequence of two-dimensionally displayed moving image data in one direction while sequentially moving a sampling position in another direction, and particular frame images are detected in the sequence of moving images based on the moving image data, such that the detected particular frame images are displayed together with a still image based on the created image data along a common time base, thus enabling an operator to immediately recognize an overall stream of moving images represented by the moving image data based on the displayed particular frame images and still image, thereby making it possible to realize an image display apparatus and method capable of readily confirming an outline of the moving images and selecting a desired scene therefrom in a short time.

6 Claims, 11 Drawing Sheets

IMAGE DISPLAY APPARATUS AND METHOD

This is a continuation of copending International Application PCT/JP98/01560 having an international filing date of Apr. 3, 1998.

FIELD OF THE ART

The present invention relates to an image display apparatus and method, and more particularly to an image display apparatus and method suitable for application to, for example, displaying an image based on a sequence of moving image data.

BACKGROUND ART

Conventionally, the confirmation of an outline of a material recorded on a recording medium as a visible image, such as a video image recorded on a so-called cinematographic-film, and selection of a desired scene from the material may be performed simply by viewing the visible view recorded on the recording medium.

On the other hand, the conformation of an outline of a material recorded in an invisible state on a recording medium such as a video tape, a disk or the like, as is the case of moving image data, and selection of a desired scene from the material, may be performed by sequentially displaying moving images based on the moving image data on a monitor along a time stream or by intermittently displaying still images in the moving images at intervals of predetermined frames.

However, when the confirmation of an outline of a material recorded in an invisible state on a recording medium, and the selection of a desired scene from the material are performed as described above, an operator only views a two-dimensional image at each time, or only views a two-dimensional still image at a certain time.

For this reason, a reduction in time is limited for confirming an outline of a material. Likewise, for selecting a desired scene, it is difficult to locate a required scene without operations in a time-base direction such as reproduction, fast forwarding or rewinding, and so on of a reproducing apparatus such as a video tape recorder or the like.

In recent years, non-linear media providing a high multi-accessibility, for example, hard disk drives and so on have been utilized as recording media for moving image data. When such recording media are utilized in a reproducing apparatus, such operations as simultaneous fast forwarding or winding of a plurality of moving images or the same moving image from a plurality of access points in parallel, or reproduction of one frame of image at each desired point may be frequently performed on the reproducing apparatus (hard disk drive or the like).

Therefore, when a non-linear medium is utilized as a recording medium for recording moving image data for purposes of building, for example, an editing system, an associated reproducing apparatus is required to provide a high functionality in terms of data accessibility, data transfer rate, data transmission speed and so on. As a result, these requirements causes a problem that a low price system is difficult to build.

DISCLOSURE OF INVENTION

The present invention has been made in view of the foregoing problem, and is intended to propose an image display apparatus and an image display method which are capable of readily accomplishing the confirmation of an outline of moving images and the selection of a desired scene from the moving images in a short time.

To solve the problems, the present invention provides an image display apparatus comprising creating means for creating image data of a still image based on data produced by one-dimensionally sampling a sequence of two-dimensionally displayed moving image data in one direction while sequentially moving a sampling position in another direction, detecting means for detecting particular frame images in a sequence of moving images based on the moving image data, and display means for displaying the particular frame images detected by the detecting means together with the still image based on the image data created by the creating means along a common time base.

As a result, an operator can immediately recognize an overall stream of moving images represented by the moving image data based on the displayed particular frame images and still image.

Also, the present invention provides an image display method comprising a first step of creating image data of a still image based on data produced by one-dimensionally sampling a sequence of two-dimensionally displayed moving image data in one direction while sequentially moving a sampling position in another direction, and detecting particular frame images in a sequence of moving images based on the moving image data, and a second step of displaying the particular frame images detected at the first step together with the still image based on the image data created by the creating means along a common time base.

As a result, an operator can immediately recognize an overall stream of moving images represented by the moving image data based on the displayed particular frame images and still image.

According to the present invention as described above, an image display apparatus is provided with creating means for creating image data of a still image based on data produced by one-dimensionally sampling a sequence of two-dimensionally displayed moving image data in one direction while sequentially moving a sampling position in another direction, detecting means for detecting particular frame images in a sequence of moving images based on the moving image data, and display means for displaying the particular frame images detected by the detecting means together with the still image based on the image data created by the creating means along a common time base, thereby allowing an operator to immediately recognize an overall stream of the moving images represented by the moving image data based on the displayed particular frame images and still image. Consequently, it is possible to realize an image display apparatus which is capable of readily confirming an outline of moving images and selecting a desired scene therefrom in a short time.

Also, according to the present invention, an image display method comprises a first step of creating image data of a still image based on data produced by one-dimensionally sampling a sequence of two-dimensionally displayed moving image data in one direction while sequentially moving a sampling position in another direction, and detecting particular frame images in a sequence of the moving images based on the moving image data, and a second step of displaying the particular frame images detected at the first step together with the still image based on the image data created by the creating means along a common time base, thereby allowing an operator to immediately recognize an overall stream of the moving images represented by the moving image data based on the displayed particular frame images and still image. Consequently, it is possible to realize an image display method which is capable of readily confirming an outline of moving images and selecting a desired scene therefrom in a short time.

BEST MODE FOR CARRYING OUT THE INVENTION

An embodiment of the present invention will hereinafter be described in detail with reference to the accompanying drawings.

(1) Video Browser

Figure 1:
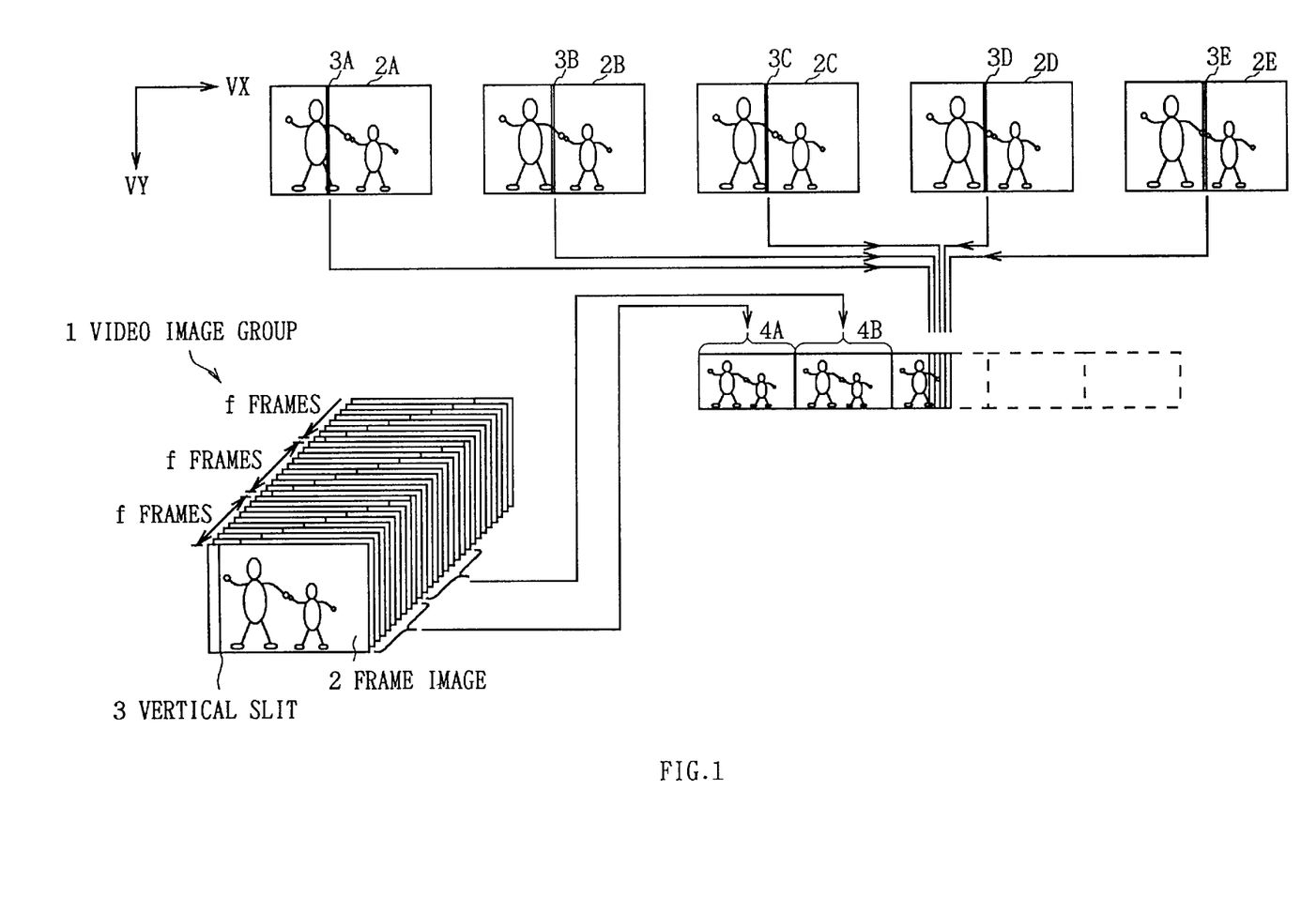
FIG. 1 is a conceptual diagram used for describing a video browser.

As illustrated in FIG. 1, a sequence of moving images based on moving image data may be regarded as frame images at respective times which are arranged in sequence in the time-base direction. Actually, in the NTSC (National Television System Committee) Standard, the frame frequency of a video signal is defined to be 30 [Hz], so that moving images are composed of 30 frame images per second.

Now consider that from a group 1 of video images composing such moving images, slits 3 in the vertical direction (hereinafter this slit is referred to as the "vertical slit") are extracted one per n frame images 2, while a slit extracting position is sequentially moved in one direction, and the extracted vertical slits 3 are sequentially arranged in another direction to form a still image (hereinafter, this still image is referred to as the "video browser") 4. It is assumed that the position at which each slit 3 is extracted is moved from the left end of a screen to the right, and when the slit extracting position reaches the right end of the screen, it is again moved from the left end of the screen to the right.

Assuming herein, for example, that n is one (n=1), the frame image 2 has X dots in the horizontal direction, and the vertical slit 3 has a slit width equal to ΔX dots, the slit position is moved from the left end to the right end in the screen every time f frame images are processed, where f is given by:

$$f = \frac{X}{\Delta X} \quad (1)$$

and respective vertical slits 3 extracted from the f frame images compose one screen of video browser 4 having X dots in the vertical direction. Then, this video browser 4 can be recognized as a still image which is a compressed version of the contents of the moving images based on f frame images 2.

Therefore, by creating the video browser 4 over the start to the end of a material, an overall flow of the material can be accurately recognized in short time based on the video browser 4.

(2) Configuration of Video Display Apparatus

Figure 2:
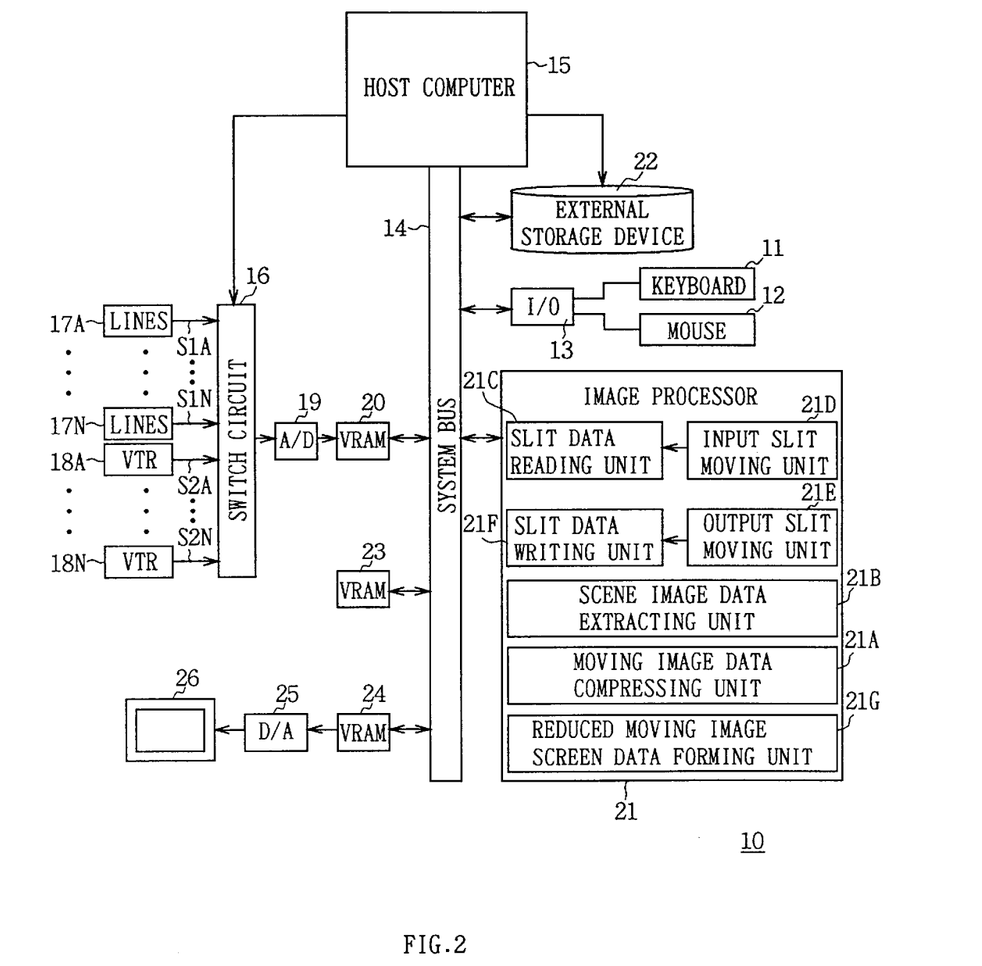
FIG. 2 is a block diagram illustrating the configuration of an image display apparatus according to an embodiment.

FIG. 2 illustrates an image display apparatus 10 to which the present invention is applied, where a keyboard 11 and a mouse 12 are connected to a host computer 15 through an input/output circuit 13 and a system bus 14 in sequence. This configuration enables an operator to give a variety of commands to the host computer 15 through the keyboard 11 and the mouse 12.

In the host computer 15 set in a video signal capture mode, a switch circuit 16 is controlled based on a command given from the operator to force the switch circuit 16 to select one video signal source from a plurality of transmission lines 17A–17N and a plurality of video tape recorders 18A–18N connected to the switch circuit 16, and to send video signals S1A–S1N, S2A–S2N supplied from the selected video signal source to an analog-to-digital convertor circuit 19.

The analog/digital convertor circuit 19 sequentially converts the video signals S1A–S1N, S2A–S2N supplied thereto to a digital form, and sequentially stores the resulting moving image data D1 in a storage area (formed corresponding to an actual display screen) of a first VRAM (Video Random Access Memory) 20 in frames.

Then, the moving image data D1 stored in the first VRAM 20 in frames is sequentially read by an image processor 21 through the system bus 14, and compress-encoded by a moving image data compressing unit 21A of the image processor 21 in accordance with a predetermined standard, for example, JPEG (Joint Photographic Experts Group) or the like.

The compress-encoded moving image data D1 is further provided to an external storage device 22, for example, comprising RAID (Redundant Array of Inexpensive Disks) or the like through the system bus 14, wherein the image data D1 is additionally given a new time code, formed into files, and stored in the external storage device 22 under the control of the host computer 15.

In this event, a scene image data extracting unit 21B of the image processor 21 detects the first frame image after a scene change as well as a frame image at a moment flash light was generated at a camera (hereinafter, these frame images are collectively referred to as the "scene images") based on image correlation information and luminance correlation information between respective frames generated by the compressing, and sends the detection result to the host computer 15 through the system bus 14.

The host computer 15 also stores a time code associated with each of scene images detected by the scene image data extracting unit 21B of the image processor 21 in sequence in the external storage device 22 as one element of a database for managing a file of the moving image data D1 (hereinafter, this file is referred to as the "moving image data file").

Further, in this event, a slit data reading unit 21C of the image processor 21 samples and extracts data of the above-mentioned vertical slit 3 (FIG. 1) (hereinafter, this data is referred to as the "slit data") from each of frames of moving image data D1 sequentially written into a first VRAM 20, while sequentially moving an extracting position in one direction, under the control of an input slit moving unit 21D.

Then, the extracted slit data are sequentially written into a storage area (formed corresponding to an actual display screen) of a second VRAM 23 by a slit data writing unit 21F, while sequentially moving a writing position in one direction, under the control of an output slit moving unit 21E of the image processor 21.

As one screen portion of slit data is written into the second VRAM 23, the slit data are read under the control of the host computer 15, provided to the external storage device 22 through the system bus 14, and stored in the external storage device 22 as one element of the database.

In this way, the image display apparatus 10 can generate compress-encoded data of moving images based on a single video signal S1A–S1N, S2A–S2N specified by the switch circuit 16 from the video signal S1A–S1N, S2A–S2N supplied from a plurality of video signal sources, and a database composed of a variety of data including a code of a predetermined scene image, image data of a video browser, and so on, and store the compress-encoded data and the database in the external storage device 22.

The host computer 15, when set in a display mode, reads image data previously stored in the external storage device 15 and provides the image processor 21 with the read image data.

The image processor 21 generates image data for displaying a predetermined screen on a monitor (hereinafter this image data is referred to as the "display image data") based on the image data provided from the external storage device 22, and stores the generated image data in a third VRAM 24.

Figure 3:
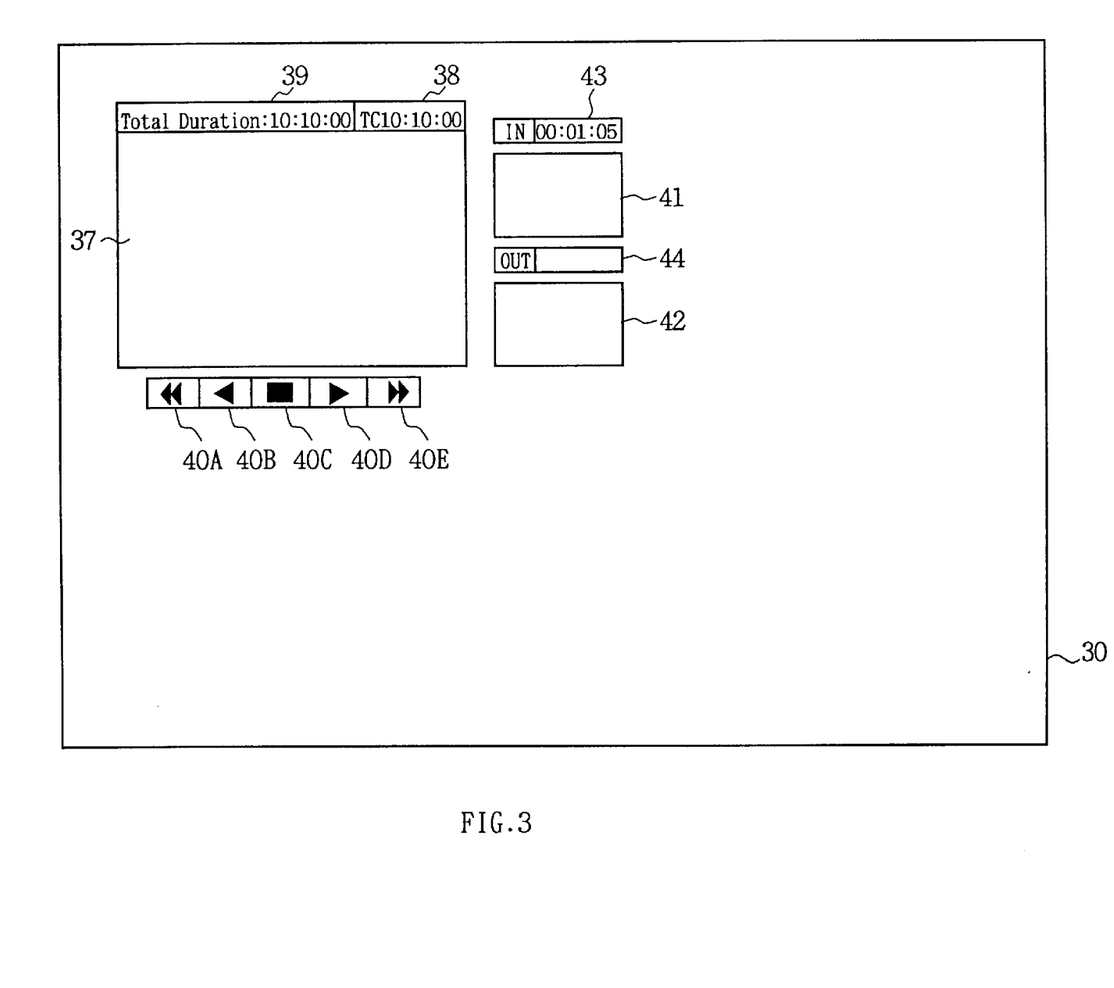
FIG. 3 is a schematic diagram illustrating an initial editing screen.

In this event, the display image data stored in the third VRAM 24 is sequentially read at predetermined periods, converted to an analog form in a digital-to-analog convertor circuit 25, and then delivered to a monitor 26. As a result, an initial editing screen 30 is initially displayed on the monitor 26, as illustrated in FIG. 3.

As a file name of a moving image data file to be edited is inputted through the keyboard 11 in this state, image data of a corresponding video browser and image data of associated scene images are read from the external storage device 22, and provided to the image processor 21 through the system bus 14.

In this event, the image processor 21 thins the supplied image data of the video browser to generate a video image of a reduced video browser in a reduced moving image screen data forming unit 21G, and decodes and thins supplied image data of respective scene images to generate image data of reduced versions of the respective scene images. Then, the image processor 21 generates display image data based on the thus generated image data, and writes the generated display image data into the third VRAM 24.

Figure 4:
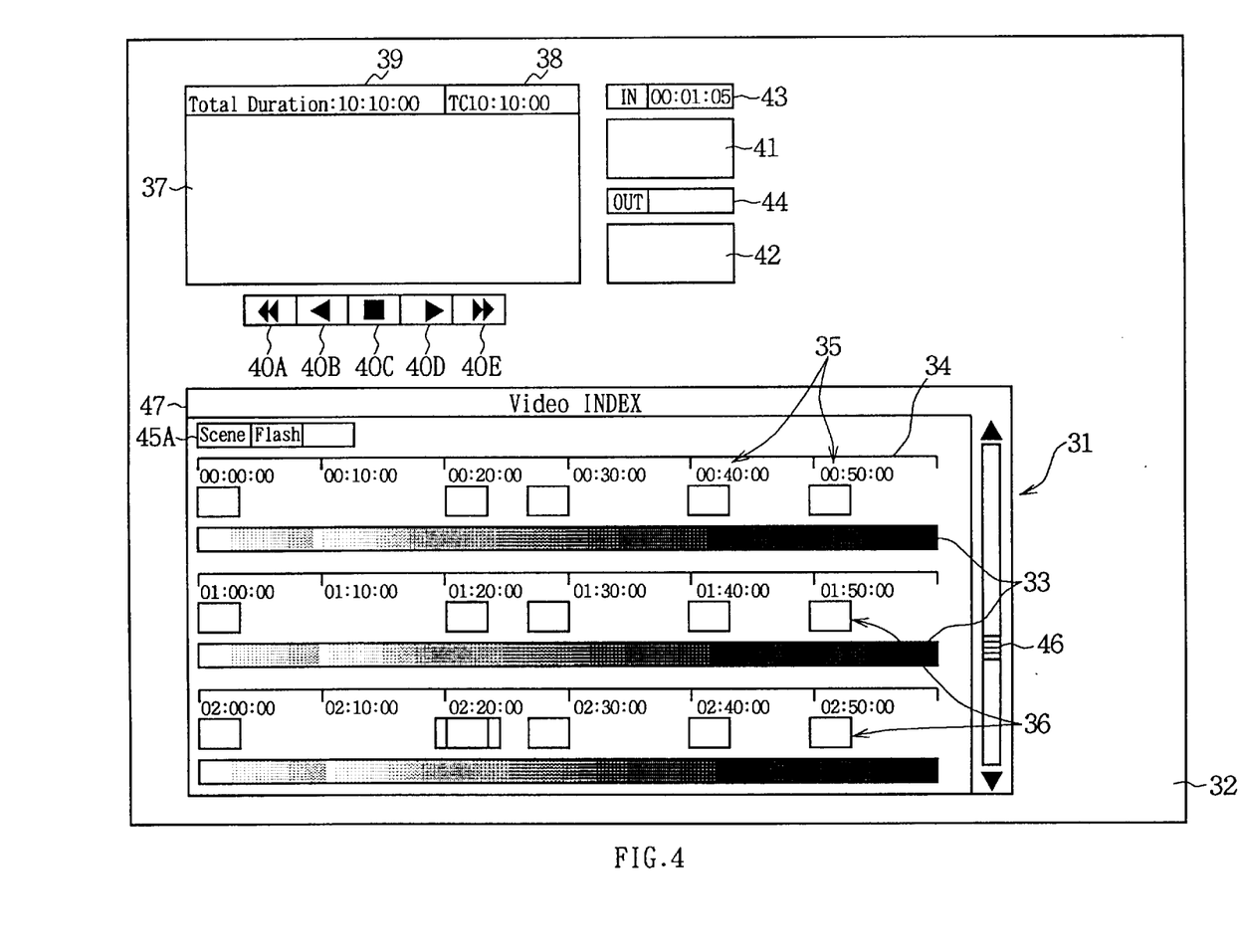
FIG. 4 is a schematic diagram illustrating an editing screen.

As a result, an editing screen 32 is displayed on the monitor 26 with a video index window 31 located at a predetermined position in the initial editing screen 30 as illustrated in FIG. 4.

In this editing screen 32, the video index window 31 includes a video browser 33 corresponding to a specified moving image data file arranged and displayed in a plurality of stages, a scale 34 and a corresponding time code 35 above an associated portion of the video browser 33, and reduced scene images 36 at corresponding positions between the video browser 33 and time scale 34 associated therewith.

Also, on the editing screen 32, a cursor (not shown) is displayed. The cursor moves in the editing screen 32 in response to manipulations on the mouse 12 under the control of the image processor 21.

Then, by clicking the mouse 12 with the cursor pointed to an arbitrary position of a video browser 33 or to an arbitrary scene image 36 on the editing screen 32, a frame image or scene image at a time code corresponding to the clicked position can be displayed in a moving image display area 37. Also, in this event, the time code of the frame image is displayed in a time code display area 38, and the length of the overall moving image data file is displayed in a total duration display area 39.

In this state, when the mouse 12 is clicked with the cursor pointed to any of remote control buttons 40A–40E, the external storage device 22 is instructed to execute a corresponding operation (rewinding, reverse reproduction, stop, normal reproduction or fast forwarding). During reverse reproduction and normal reproduction, a reproduced moving image is displayed in the moving image area 37.

Further, when the mouse 12 is clicked with the cursor positioned on a mark-in image display area 41 or on a mark-out image display area 42 while a frame image is being displayed in the moving image display area 37, a mark-in point or a mark-out point can be specified during editing. In this event, a specified frame image (i.e., the frame image previously displayed in the moving image a display area 37) is displayed in the mark-in image display area 41 or the mark-out image display area 42, with the time code associated with the frame image being displayed in a mark-in image time code display area 43 or in a mark-out image time code display area 44.

The time code information on the thus specified mark-in point or mark-out point is provided to the external storage device 22 for storage. At a later time, when this time code information is provided to an editor (not shown) at a rear stage as required, editing is performed based on the time code information.

Further, on this editing screen 32, when the mouse 12 is clicked with the cursor positioned on a scene image display change specifying button 45A or 45B displayed in an upper left portion of the video index window 31, a so far displayed scene image 36 can be changed to the first frame image ("Scene") after a scene change or to a frame image ("Flash") which has a luminance level significantly changed as compared with frame images before and after the displayed image.

Moreover, by manipulating a scroll bar 46 through mouse manipulations, the video browser 33 and the scene images 36 may be scrolled such that portions of the video browser 33 and the scene image 36, which are not being displayed at that time, can be displayed in the video index window 31. In addition, when the mouse 12 is clicked with the cursor positioned on a window close button 47, the video index window 31 can be closed.

Figure 5:
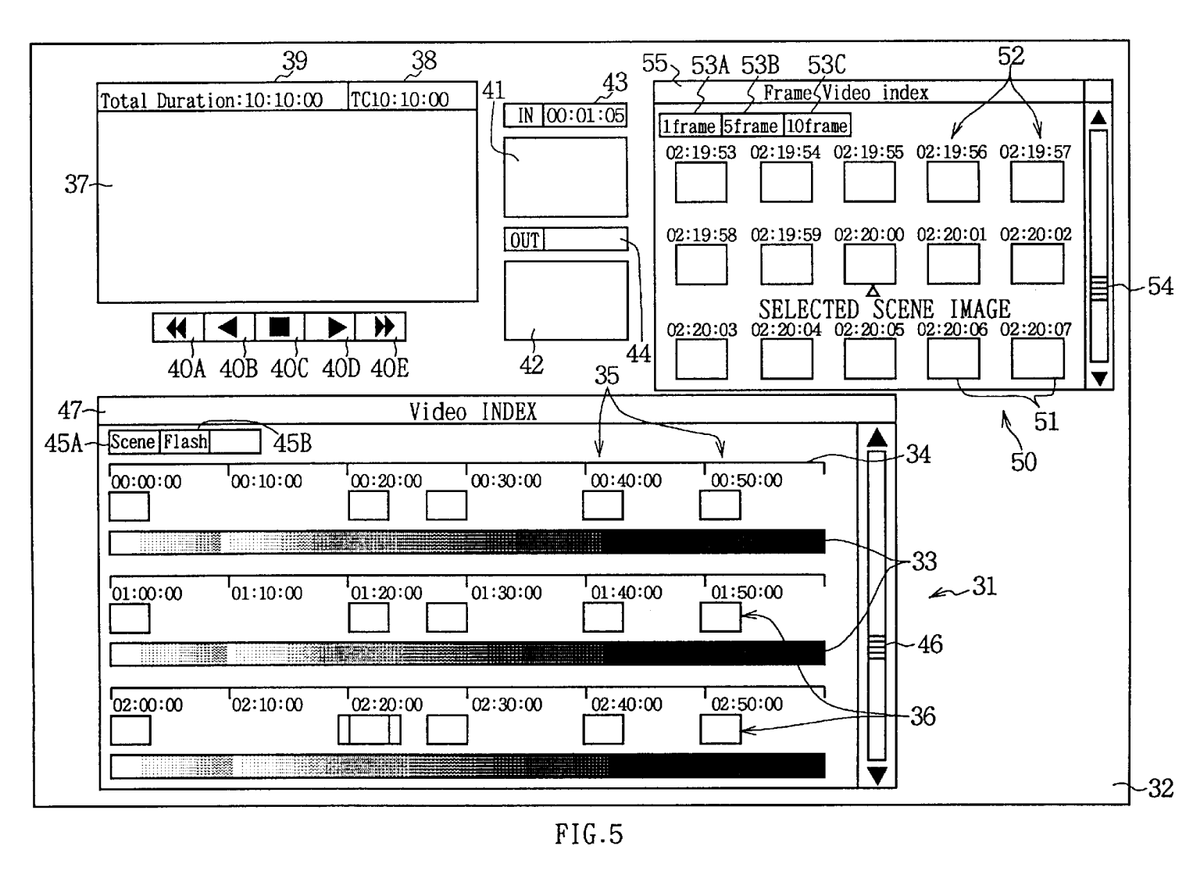
FIG. 5 is a schematic diagram illustrating an editing screen.

On the editing screen 32, on the other hand, as the mouse 12 is double clicked with the cursor pointed to an arbitrary position of a video browser 33 or an arbitrary scene image 35, a frame image index window 50 can be displayed in the editing screen 30, as illustrated in FIG. 5.

In this event, the frame image index window 50 includes several previous and subsequent frames of frame images 51 centered on a frame image 36 corresponding to a double clicked position of the video browser 33 or a double clicked scene image 36, which are displayed together with associated time codes 52.

At this time, when the mouse 12 is clicked after selecting any of display interval frame amount specifying buttons 53A–53B displayed on an upper left portion of the frame image index window 50, the interval at which frame images are displayed can be changed to either one frame ("1 frame"), five frames ("5 frames") or ten frames ("10 frames").

Also, when the mouse 12 is clicked with the cursor pointed to any of the frame images 51 displayed in the frame image index window 50, the clicked frame image 51 can be displayed in the moving image display area 37.

Further, in the frame image index window 50, when a scroll bar 54 is manipulated through mouse manipulations to scroll the frame images 51 displayed in the frame image index window 50, previous or subsequent frame images 51 may be displayed therein. In addition, when the mouse 12 is clicked on a window close button 55, the frame image index window 50 can be closed.

Thus, after the mouse 12 is clicked with the cursor positioned on a desired frame image 51 in the frame image index window 50 to display the desired frame image 51 in the moving image display area 37, the mouse 12 is clicked on the close button 55 to close the frame image index window 50. Subsequently, as the mouse 12 is clicked on the mark-in image display area 41 or on the mark-out image display area 42, a mark-in point or a mark-out point during editing can be specified utilizing the frame image index window 50.

In this way, the image display apparatus 10, when set in the display mode, can display a video browser 33 and associated scene images 36 corresponding to a specified moving image data file on the monitor, and sequentially specify desired mark-in point and mark-out point based on the video browser 33 and the respective scene images 36.

(3) Variety of Processing by Host Computer

The operations as described above in the capture mode and in the display mode are all performed under the control of the host computer 15 (FIG. 2).

Figure 6:
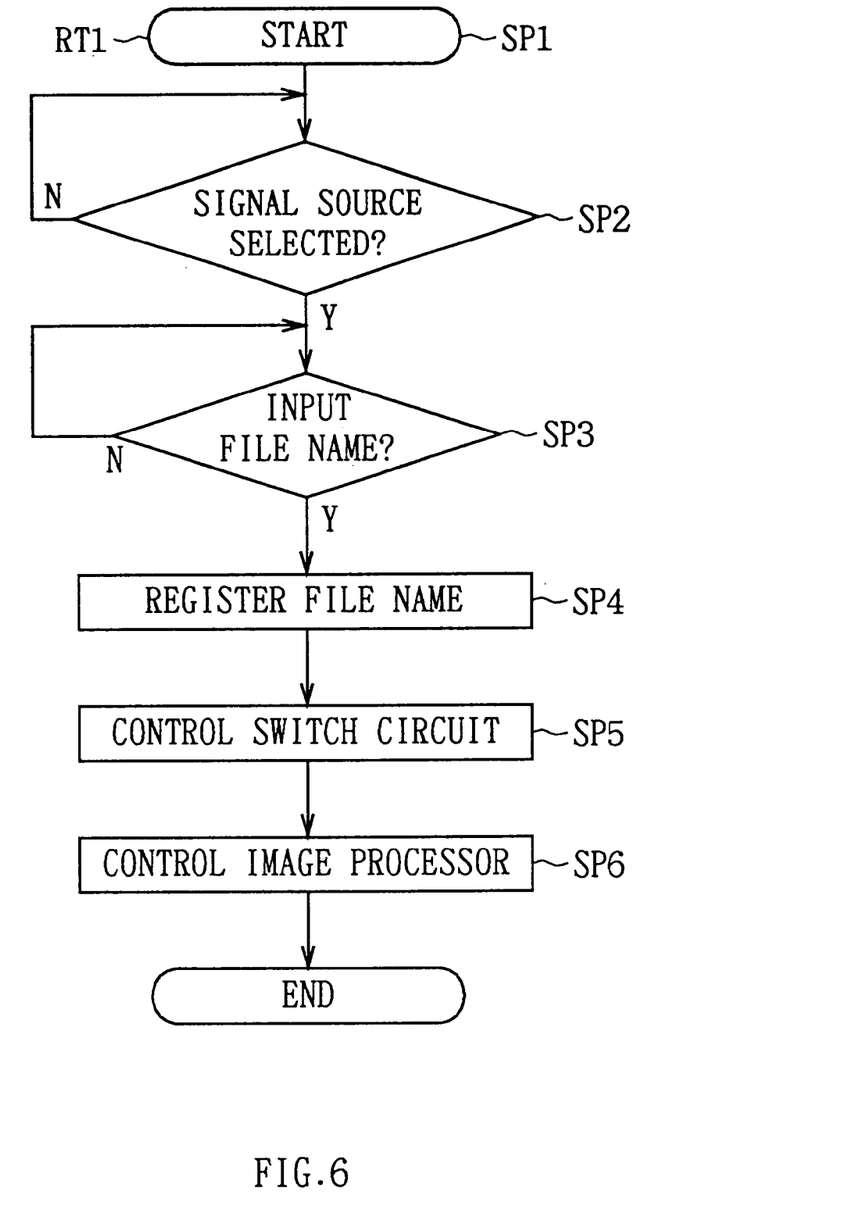
FIG. 6 is a flow chart illustrating a signal capture mode processing procedure.

Actually, when the host computer 15 captures video signals S1A–S1N, S2A–S2N in the capture mode, a signal capture processing procedure RT1 illustrated in FIG. 6 is invoked. After this signal capture processing procedure RT1 is started at step SP1, the host computer 15 waits for a video signal source to be specified to capture a signal at next step SP2.

When the host computer 15 receives an affirmative result at step SP2 at a later time, the procedure RT1 proceeds to step SP3, where the host computer 15 determines whether or not a file name has been inputted for a moving image data file to be formed based on the video signal S1A–S1N, S2A–S2N supplied from the specified video signal source.

Then, when the host computer 15 receives an affirmative result at step SP3 at a later time, the procedure RT1 proceeds to step SP4 where the inputted file name is registered in the external storage device 22.

Next, the procedure RT1 proceeds to step SP5 where the host computer 15 controls the switch circuit 16 to select the specified video signal source and to sequentially write moving image data D1 based on the video signal S1A–S1N, S2A–S2N supplied from the video signal source, frame by frame, into the first VRAM 20.

Next, the procedure RT1 proceeds to step SP16, where the host computer 15 controls the image processor 21 to sequentially compress encode one frame portion of the moving image data D1 sequentially written into the first VRAM 20, sequentially detect scene images associated therewith, extract slit data of vertical slits 3 while sequentially moving a sampling position in one direction, and write the extracted slit data into the second VRAM 23.

Also, at this step, the host computer 15 controls the external storage device 22 to add new time codes to the compress-encoded moving image data D1 supplied from the image processor 21 through the system bus 14, transform the entire moving image data D1 into a file to store the file in the external storage device 22, and store time codes of scene images detected by the image processor 21 in the external storage device 22 as a database.

Then, as one screen portion of slit data is written into the second VRAM 23, the host computer 15 reads and sends the slit data to the external storage device 22, and simultaneously controls the external storage device 22 to store the slit data therein.

Subsequently, when the video signals S1A–S1N, S2A–S2N have been supplied from the specified video signal source, the host computer 15 controls the switch circuit 16 to stop capturing the video signal S1A–S1N, S2A–S2N, and controls the image processor 21 to stop a variety of processing performed thereby associated with the compressing, creation of a video browser and so on, followed by the procedure RT1 proceeding to step SP7 where the signal capture mode processing procedure RT1 is terminated.

Figure 7:
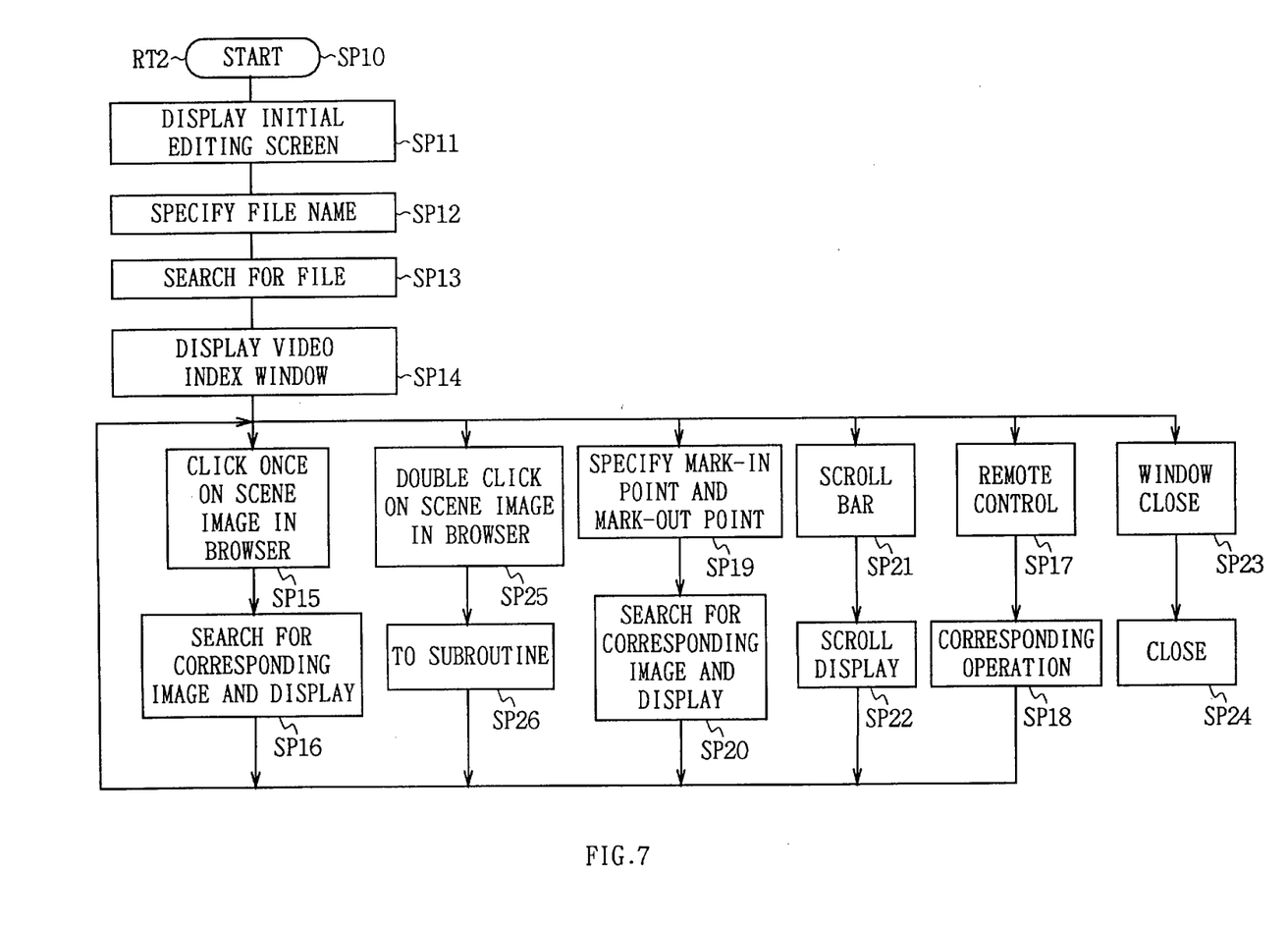
FIG. 7 is a flow chart illustrating a display mode processing procedure.

On the other hand, when the display mode is selected, the host computer 15 starts a display mode processing procedure RT2 illustrated in FIG. 7 at step SP10. At next step SP11, the host computer 15 controls the external storage device 22 to read corresponding image data, and instructs the image processor 21 to generate display image data based on the read image data and write the display image data into the third VRAM 24, thereby displaying the initial editing screen 30 (FIG. 3) on the monitor 26.

Next, the procedure RT2 proceeds to step SP12, where the host computer 15 waits for a file name of a moving image data file for display to be inputted. Subsequently, when the file name is inputted, the procedure RT2 proceeds to step SP13, where the host computer 15 controls the external storage device 22 to search for the corresponding moving image data file.

When the host computer 15 detects the corresponding moving image data file, the procedure RT2 proceeds to step SP14, where the host computer 15 controls the external storage device 22 to read image data of a corresponding video browser and image data of associated scene images, and instructs the image processor 21 to generate predetermined display image data based on these image data and to write the predetermined display image data into the third VRAM 24, thereby displaying the editing screen 32 of FIG. 4 including the video index window 31 located in a lower portion of the initial editing screen 30 on the monitor 26.

In this state, when the host computer 15 confirms at step SP15 that the mouse is clicked once with the cursor pointed to an arbitrary position on the video browser 33 or on an arbitrary scene image 36 and, the procedure RT2 proceeds to step SP16, where the host computer 15 controls the external storage device 22 to read image data of a frame image at a clicked position of the video browser 33 or image data of a clicked scene image 36, and instructs the image processor 21 to generate display image data based on these image data and to write the generated display image data into the third VRAM 24, thereby displaying the frame image at the clicked position of the video browser 33 or the clicked scene image 36 in the moving image display area 37 on the editing screen 32.

Then, when the host computer 15 confirms at step SP17 that the mouse 12 is clicked in this state with the cursor positioned on any of the remote control buttons 40A-40E, the procedure RT2 proceeds to step SP18, where the host computer 15 controls the external storage device 22 to execute a corresponding operation. Also, when a specified operation is reverse reproduction or normal reproduction, the host computer 15 instructs the image processor 21 to generate display image data based on image data outputted from the external storage device 22 and to write the display image data into the third VRAM 24, thereby displaying a moving image based on reproduced moving image data D1 in the moving image display area 37 on the editing screen 32.

Further, when the host computer 15 confirms at step SP19 that the mouse is clicked with the cursor pointed to the mark-in image display area 41 or the mark-out image display area 42 in the state in which the moving image is being displayed in the moving image display area 37 on the editing screen 32, the procedure RT2 proceeds to step S20, where the host computer 15 controls the external storage device 22 to read image data of the moving image displayed in the moving image display area 37 and associated time code, and instructs the image processor 21 to generate display image data based on the image data and the time code information and to write the display image data into the third VRAM 24, thereby displaying the moving image displayed in the moving image display area 37 in the mark-in image display area 41 or the mark-out image display area 42 as well as displaying a time code associated with the moving image in the mark-in time code display area 43 or the mark-out time code display area 44.

Further, when the host computer 15 confirms at step SP21 that the scroll bar 46 is manipulated through mouse manipulations, the procedure RT2 proceeds to step SP22, where the host computer 15 controls the external storage device 22 to read image data of a corresponding video browser and image data of respective scene images associated therewith, and instructs the image processor 21 to generate predetermined display image data based on these image data and to write the predetermined display image data into the third VRAM 24, thereby displaying and scrolling a video browser 33, respective scene images 36 and so on in the video index window 31 on the editing screen 30.

Further, when the host computer 15 confirms at step SP23 that the mouse 12 is clicked with the cursor positioned on the window close switch 47, the procedure RT2 proceeds to step SP24, where the host computer 15 controls the external storage device 22 to read corresponding image data, and instructs the image processor 21 to generate display image data based on the read image data and to store the display image, data in the third VRAM 24, thereby displaying the editing screen 32 with the closed video index window 31 (i.e., the initial editing screen 30) on the monitor. In this event, if a mark-in point and a mark-out point have been specified, the host computer 15 provides time codes associated with the specified mark-in point and mark-out point to the external storage device 22 for storage.

Figure 8:
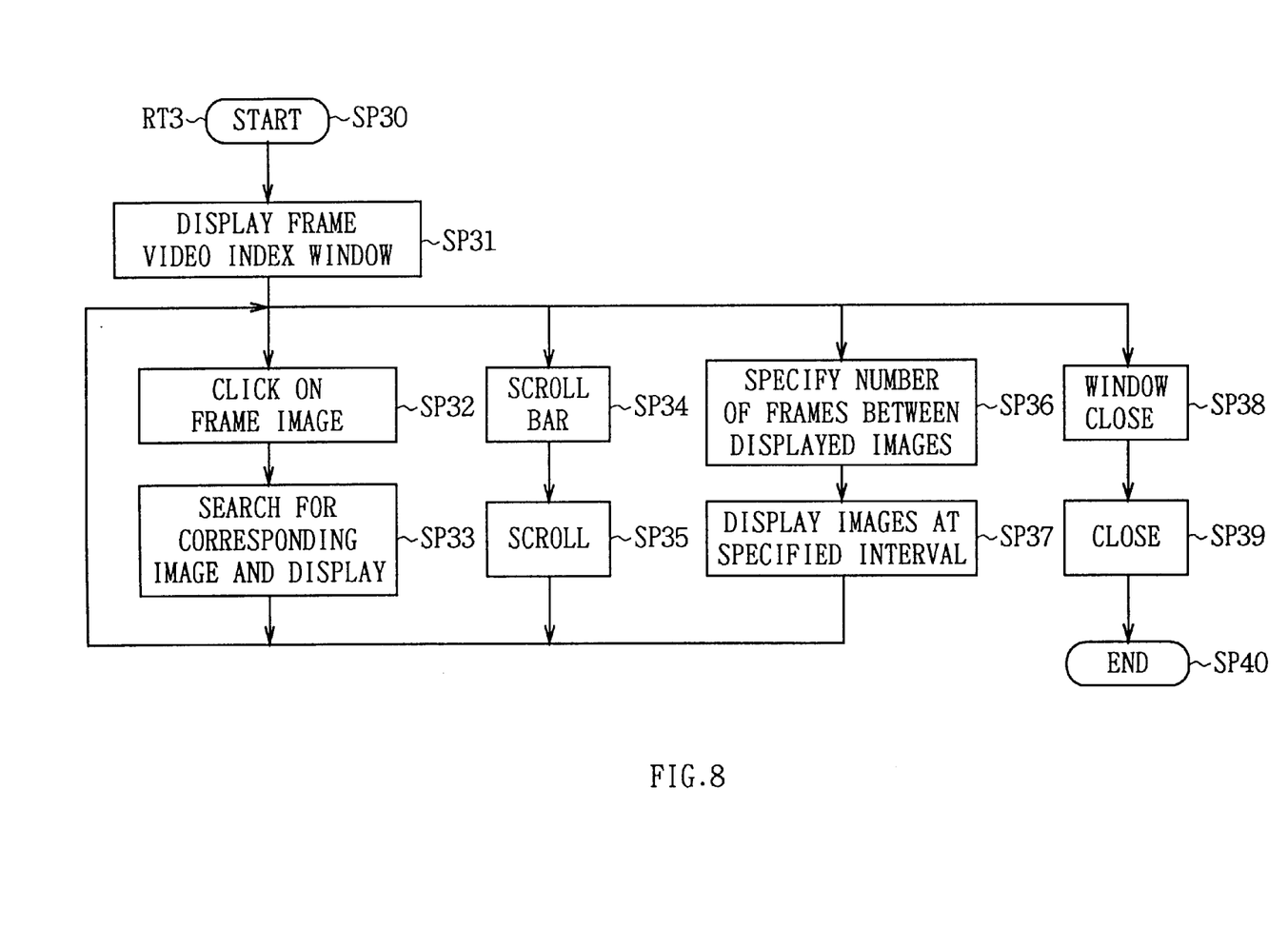
FIG. 8 is a flow chart illustrating a frame video index display processing procedure.
Figure 9:
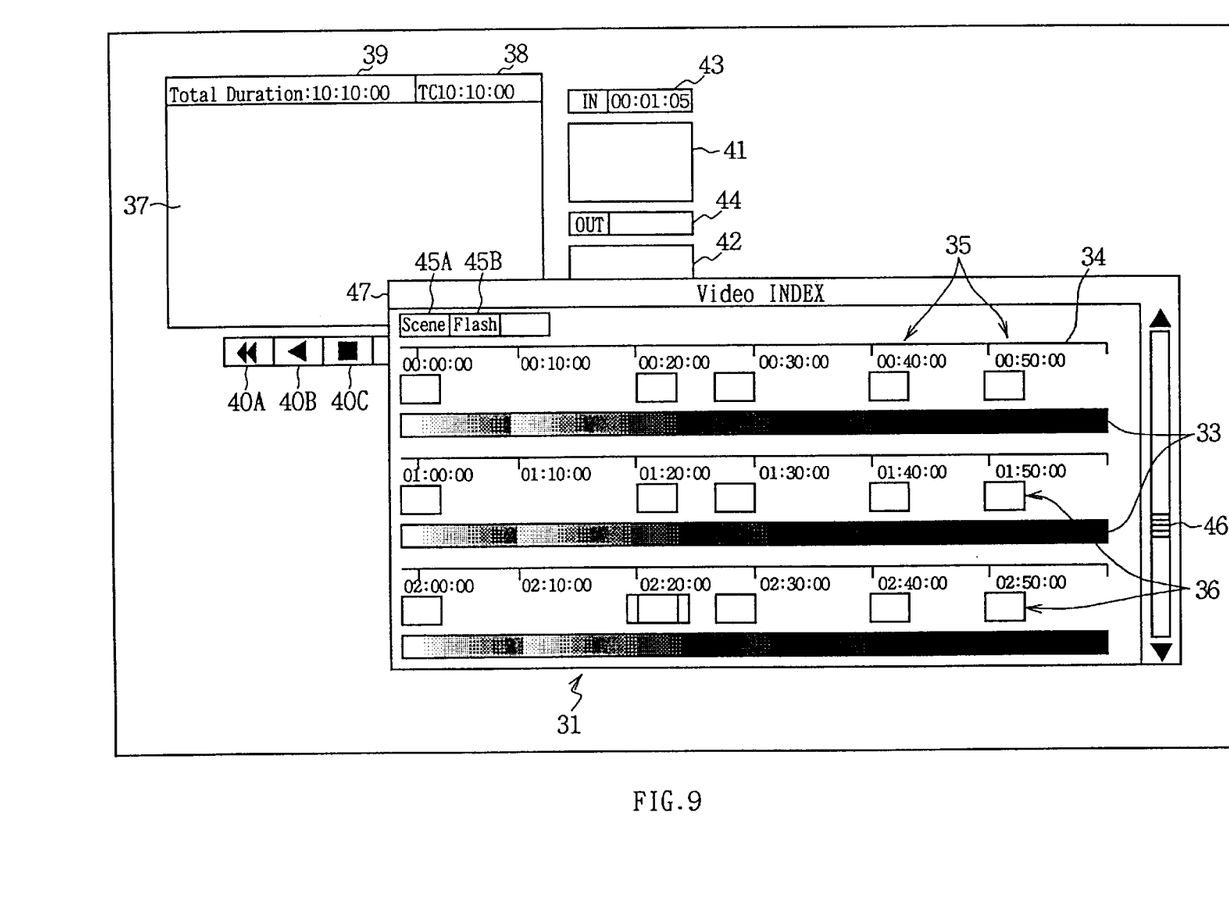
FIG. 9 is a schematic diagram illustrating another embodiment.
Figure 10:
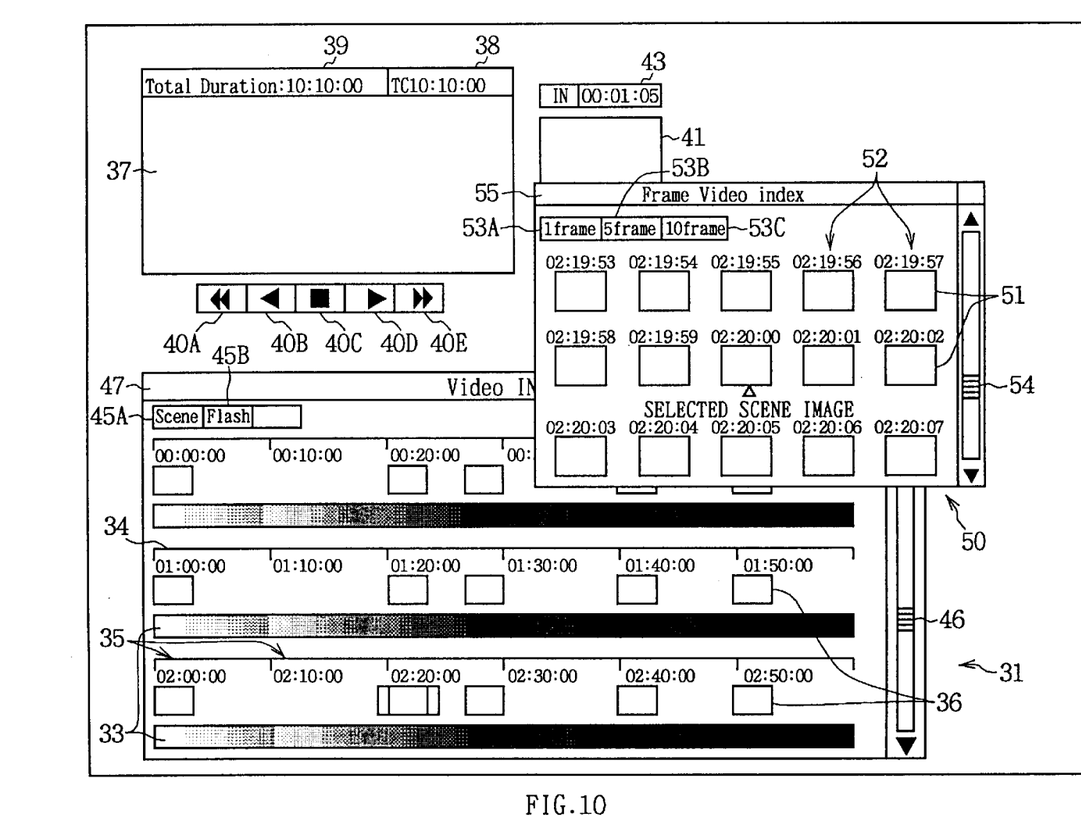
FIG. 10 is a schematic diagram illustrating another embodiment.
Figure 11:
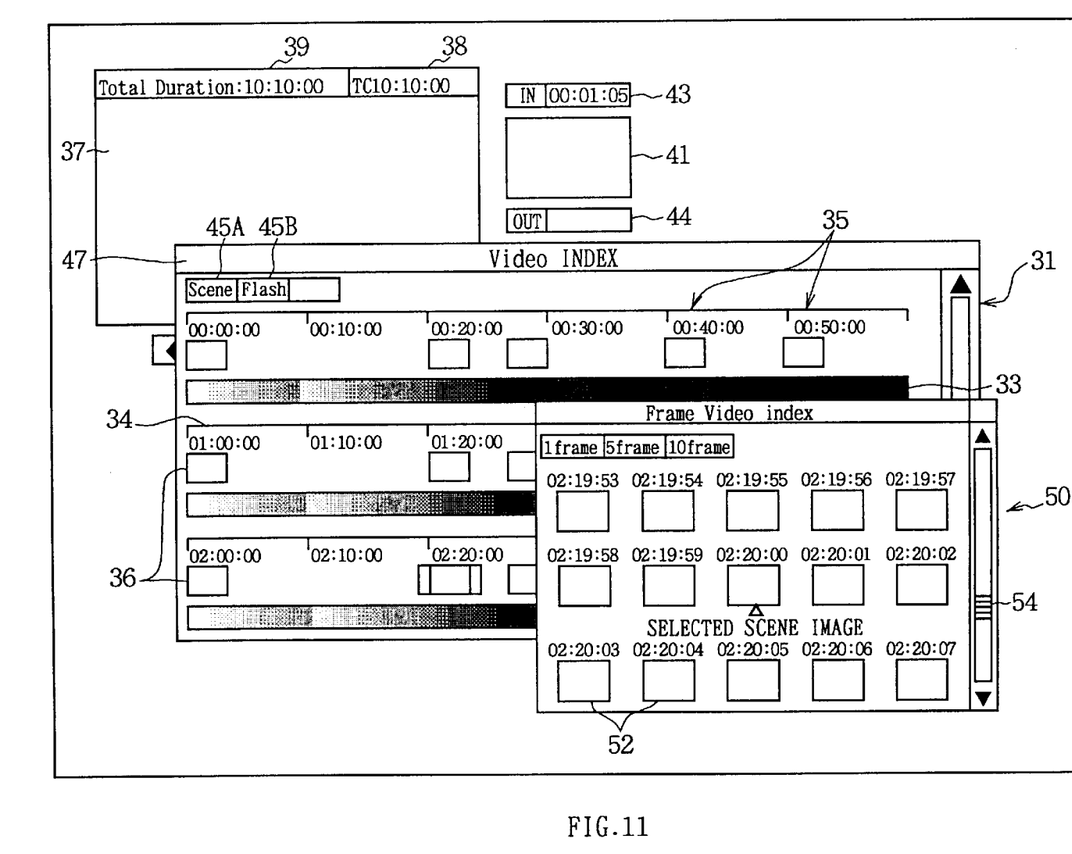
FIG. 11 is a schematic diagram illustrating another embodiment.

On the other hand, when the host computer 15 confirms at step SP25 that the mouse 12 is double clicked with the cursor pointed to an arbitrary position in a video browser 33 or an arbitrary scene image 36 while the video index window 31 is being displayed, the procedure RT2 proceeds to step SP26 to execute a frame video index display processing procedure RT3 illustrated in FIG. 8.

Actually, when the frame video index display processing procedure RT3 is started at step SP30, the host computer 15 controls the external storage device 22 to read several previous and subsequent frames of image data centered on a frame image corresponding to a double-clicked position in the video browser 33 or to a scene image 36, and instructs the image processor 21 to generate display image data based on the image data and to write the display image data into the third VRAM 24, thereby displaying the frame video index window 50 (FIG. 5) in the editing screen 32.

When the host computer 15 confirms at step SP32 that the mouse 12 is clicked in this state with the cursor positioned on any frame image 51 in the frame video index window 50, the procedure RT3 proceeds to step SP33, where the host computer 15 executes processing similar to step SP16 of the aforementioned edit screen display processing procedure RT2 to display the clicked frame image in the moving image display area 37 on the editing screen 32.

Also, when the host computer 15 confirms at step SP34 that the scroll bar 54 in the frame video index window 50 is manipulated through mouse manipulations, the procedure RT3 proceeds to step SP35, where the host computer 15 controls the external storage device 22 to sequentially read image data of corresponding frame images, and instructs the image processor 21 to sequentially generate display image data based on the image data and to sequentially write the display image data into the third VRAM 24, thereby displaying and scrolling frame images 51 appearing in the frame video index window 50.

Further, when the host computer 15 confirms at step SP36 that the mouse 12 is clicked with the cursor positioned on any of the display interval frame amount specifying buttons 53A–53C, the procedure RT3 proceeds to step SP37, where the host computer 15 controls the external storage device 22 to read image data of frame images 51 at the specified intervals, and instructs the image processor 21 to generate display image data based on the image data and to store the display image data into the third VRAM 24, thereby changing the current interval of the frame images 51 displayed in the frame video index window 50 to the specified interval.

Further, when the host computer 15 confirms at step SP38 that the mouse 12 is clicked with the cursor positioned on the window close button 55 in the frame video index window 50, the procedure RT3 proceeds to step SP39, where the host computer 15 controls the external storage device 22 to read corresponding image data, and instructs the image processor 21 to generate display image data based on the image data and to write the display image data into the third VRAM 24, thereby displaying the editing screen 32 with the closed frame video index window 50 (FIG. 4), followed by the procedure RT3 proceeding to step SP40, where the host computer 15 terminates the frame video index display processing procedure RT3 and subsequently returns to the display mode processing procedure RT2.

(4) Operation and Effects of the Image Display Apparatus

In the configuration described above, the image display apparatus 10, when set in the capture mode for capturing any video signals S1A–S1N, S2A–S2N, captures specified video signals S1A–S1N, S2A–S2N, sequentially converts the captured video signals into a digital form, compress encodes the resulting moving image data D1, adds time codes to the encoded moving image data, and transforms the entire moving image data into a file which is stored in the external storage device 22.

In this event, the image display apparatus 10 detects a predetermined scene image based on image correlation information, luminance correlation information and so on between adjacent frames generated by the compress encoding processing, and stores positional information on the detected scene image in the external storage device 22 as a database for managing a moving image data file associated therewith. Also, in this event, the image display apparatus 10 extracts slit data from image data while sequentially moving a sampling position and stores image data of a video browser generated based on the slit data in the database.

When the display mode is later selected, the image display apparatus 10 displays the editing screen 32 including a video browser 33 together with associated scene images 36, as illustrated in FIG. 4, on the monitor 26 based on moving image data files and an associated database stored in the external storage device 22.

Therefore, since the image display apparatus 10 set in the display mode simultaneously displays a video browser 33, composed of still images created by combining one-dimensional images corresponding to slit data produced by one-dimensionally sampling moving images, together with the scene images 36 at respective desired times corresponding to the time-base direction, it is possible to readily know an overall stream of a material through these video browser 33 and scene images 36 as well as past and future scene situations of the material in the time-base direction based on the respective scene images 36. The image display apparatus 10, therefore, provides for a corresponding reduction in time required for an operation for locating a desired scene in moving images and a reduction in the number of times of accesses to the external storage device 22.

Also, advantageously, the image display apparatus 10 needs to access to the external storage device 22 a reduced number of times and accordingly does not require a high functionality in terms of data accessibility, data transfer rate, data transfer speed and so on, thereby making it possible to build a system such as an editing system, by way of example, at a correspondingly reduced cost.

According to the configuration described above, in the capture mode for capturing video signals S1A–S1N, S2A–S2N, positions of particular scene images are detected, and image data of a video browser is generated based on the video signals S1A–S1N, S2A–S2N, such that the video browser and scene images are simultaneously displayed on the monitor along a common time-base in the display mode, thereby making it possible to readily know an overall stream of a material and previous and future scene situations of the material in the time-base direction based on the respective scene images 36. Consequently, the present invention can realize an image display apparatus which is capable of readily confirming an outline of moving images and selecting a desired scene therefrom in a short time.

(5) Other Embodiments

In the foregoing embodiment, when slit data are sampled from a sequence of two-dimensionally displayed moving image data, the sampling position is sequentially moved from the right end to the left end of the screen. The present invention, however, is not limited to this particular way of sampling the slit data, and alternatively, the sampling position may be sequentially moved from the left end to the right end of the screen, or the sampling position may be sequentially moved from one corner to a diagonally opposite corner of the screen. In addition, any of various other directions may be applied to the sampling position moving direction.

The foregoing embodiment has been described for the case where the image processor 21 detects, as a particular frame image, the first frame image after a scene change or a frame image having a luminance level presenting a significant change as compared with previous and subsequent frame images. The present invention, however, is not limited to the detection of such images, and the image processor 21 may extract any other particular frame image than those.

Further, in the foregoing embodiment, the single image processor 21 serves as a means for creating image data of a video browser based on data produced by one-dimensionally sampling a sequence of two-dimensionally displayed moving image data in one direction while sequentially moving a sampling position in another direction, and also as a detecting means for detecting particular frame images within a sequence of moving images based on the moving image data, and these are processed in software. The present invention, however, is not limited to this particular configuration. Alternatively, the creating means and detecting means may be separately configured, and processed in hardware.

Furthermore, in the foregoing embodiment, the display means for displaying a particular frame image (the first frame after a scene change or a frame image having a luminance level presenting a significant change as compared with previous and subsequent frame images) detected by the scene image data extracting unit 21B of the image processor 21 together with a video browser 33 along a common time base is composed of the host computer 15, the reduced moving image screen data forming unit 21G of the image processor 21, the third VRAM 24, the digital-to-analog convertor circuit 25 and the monitor 26. The present invention, however, is not limited to this particular configuration, and a variety of other configurations may be applied to the display means.

Also, in the foregoing embodiment, the point specifying means for specifying a desired point in a video browser 33 or a desired scene image 36 displayed on the monitor 26 is composed of the mouse 12 and the image processor 21 for displaying the cursor movable in response to manipulations of the mouse 12 on the editing screen 32. The present invention, however, is not limited to this particular configuration, and a variety of other configurations may be applied to the point specifying means.

Industrial Capability

An image display apparatus and method according to the present invention can be applied to such a case that moving images, still images or the like are edited in an editor employing non-linear media which can reproduce image data from arbitrary recording area such as hard disk drives.

What is claimed is:

1. An image display apparatus, comprising: creating means for creating a still image based on data produced by one-dimensionally sampling a sequence of two-dimensional images which represent a moving image, wherein said one-dimensional sampling is carried out by sampling each of said two-dimensional images along a one-dimensional path and changing the relative position of said path within each said two-dimensional image on an image-by-image basis;

detecting means for detecting notable images within said sequence of two-dimensional images; and display means for displaying at least one of said notable images and said still image along with a time scale graduated with a numerical indication of a time code that is common to both said notable images and said still image;

whereby said display means is further operable to display a moving image area, a mark-in area, a mark-out area and a multiple of operation button areas;

whereby said operation button areas are respectively operable to initiate respective playback modes for said sequence of two-dimensional images;

whereby, when said sequence of two-dimensional images is displayed in said moving image area on a frame-by-frame basis and said mark-in area or mark-out area is selected by a selection means, a frame is displayed in the selected area, said frame being the frame displayed in the moving image area at the time of selection of said mark-in area or mark-out area;

whereby when a computer input device is used to indicate a position within said still image, a frame image index window is displayed, said frame image index window displaying several frame images centered on a frame image corresponding to said position;

whereby said display means is further operable to display a scene button operation area that is operable to initiate display of a frame image immediately following the first scene change that occurs after an image currently displayed in said moving image area;

whereby said apparatus is operable to simultaneously display, on a single screen, at least one of said notable images, said still image, said time scale graduated with a numerical indication of a time code that is common to both said notable images and said still image, said moving image, said mark-in area, said mark-out area, said multiple of operation button areas and said scene button operation area;

whereby said still image, said notable images and said moving image are distinct from one another and are displayed in distinct areas without one being a part of another.

2. An image display apparatus according to claim 1, wherein said notable images include at least one image which is the first image following a scene change in said moving image.

3. An image display apparatus according to claim 1, wherein said sequence of two-dimensional images is produced by a camera which also outputs a flash of light, and wherein said notable images include at least one image which immediately follows said flash of light output by the camera.

4. An image display method, comprising the steps of:

creating a still image based on data produced by one-dimensionally sampling a sequence of two-dimensional images which represent a moving image, wherein said one-dimensional sampling is carried out by sampling each of said two-dimensional images along a one-dimensional path and changing the relative position of said path within each said two-dimensional image on an image-by-image basis;

detecting notable images within said sequence of two-dimensional images; and displaying, via a display means, at least one of said notable images and said still image along with a time scale graduated with a numerical indication of a time code that is common to both said notable images and said still image;

whereby said display means is further operable to display a moving image area, a mark-in area, a mark-out area and a multiple of operation button areas;

whereby said operation button areas are respectively operable to initiate respective playback modes for said sequence of two-dimensional images;

whereby, when said sequence of two-dimensional images is displayed in said moving image area on a frame-by-frame basis and said mark-in area or mark-out area is selected by a selection means, a frame is displayed in the selected area, said frame being the frame displayed in the moving image area at the time of selection of said mark-in area or mark-out area;

whereby when a computer input device is used to indicate a position within said still image, a frame image index window is displayed, said frame image index window displaying several frame images centered on a frame image corresponding to said position;

whereby said display means is further operable to display a scene button operation area that is operable to initiate display of a frame image immediately following the first scene change that occurs after an image currently displayed in said moving image area;

whereby said method includes simultaneously displaying, on a single screen, at least one of said notable images, said still image, said time scale graduated with a numerical indication of a time code that is common to both said notable images and said still image, said moving image, said mark-in area, said mark-out area, said multiple of operation button areas and said scene button operation are; and whereby said still image, said notable images and said moving image are distinct from one another and are displayed in distinct areas without one being a part of another a.

5. An image display method according to claim 4, wherein said notable images include at least one image which is the first image following a scene change in said moving image.

6. An image display method according to claim 4, wherein said sequence of two-dimensional images is produced by a camera which also outputs a flash of light, and wherein said notable images include at least one image which immediately follows said flash of light output by the camera.

* * * * *